Nov. 25, 1958  B. JOHANSON ET AL  2,861,829

DETACHABLE CONNECTION ARRANGEMENT

Filed Oct. 24, 1955

INVENTORS:
Bertil Johanson, Erik Wilhelm Ehn
and Walter Sommer
By: Michael S. Struker
agt.

United States Patent Office 2,861,829
Patented Nov. 25, 1958

2,861,829

DETACHABLE CONNECTION ARRANGEMENT

Bertil Johanson, Goteborg, Sweden, and Erik Wilhelm Ehn, Stuttgart-Bad Cannstatt, and Walter Sommer, Leonberg, Germany, assignors to SKF Kugellagerfabriken G. m. b. H., Stuttgart-Bad Cannstatt, Germany Application October 24, 1955, Serial No. 542,214

Claims priority, application Germany October 23, 1954

6 Claims. (Cl. 287—119)

The present invention relates to a detachable connection arrangement.

More particularly, the present invention relates to a detachable connection between an outer tubular member and an inner cylindrical member arranged therewithin for axial movement relative thereto, and is especially adapted for use in a weighting roller incorporated in a spinning machine or the like.

There exist detachable connections for joining together two coaxial tubular bodies or the like which connections incorporate spring rings or the like that seat in cooperating grooves formed in the tubular bodies. It has been found, however, that with such arrangements it is very difficult and inconvenient to engage and disengage the tubular bodies. Moreover, the useful life of such connections is relatively short as the result of the heavy wear of the grooves and the spring rings.

It is therefore an object of the present invention to provide a detachable connection arrangement which overcomes the above disadvantages.

It is another object of the present invention to provide a detachable connection arrangement by means of which two coaxial members may easily be connected and disconnected from each other.

The objects of the present invention also include provision of a detachable connection arrangement which comprises a minimum number of parts each of which may be mass produced extremely economically.

With the above objects in view, the present invention mainly consists in a detachable connection arrangement which comprises an outer tubular member and an inner tubular member arranged therewithin for axial movement relative thereto. One of the members is formed with receiving means, such as an annular groove along its inner surface, and projecting means, which are preferably annular, are arranged on the other of the members and are axially movable therewith. The projecting means are resiliently yieldable in radial direction of the members and the receiving and projecting means are constructed and arranged so as to be adapted to be moved into an engaging position wherein the projecting means is received within the receiving means when the members are moved relative to each other in one axial direction into a coupled position, and so as to be adapted to be moved out of the engaging position when the members are moved relative to each other in the opposite axial direction out of the coupled position, the projecting means resiliently yielding during such movements.

According to one preferred embodiment of the present invention the projecting means are carried by a tubular connecting member which is suitably secured to one of the inner and outer members for axial movement therewith, the projecting means being adapted to be received within receiving means formed in the other of the inner and outer members. The connecting member is formed of a resilient material, such as a resilient plastic or spring steel, and may be longitudinally slotted.

According to another preferred embodiment of the present invention the projecting means may be carried by or be integral with one of the inner and outer members and be adapted to be received within receiving means formed in the other of the inner and outer members.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
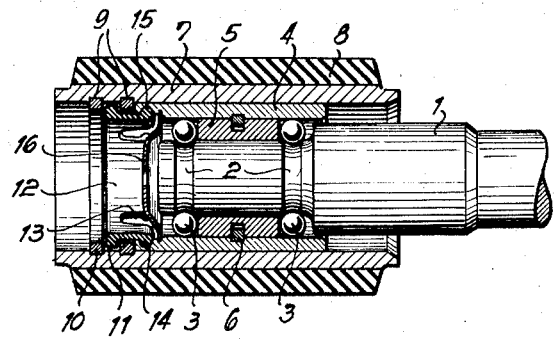
Fig. 1 is a sectional view of a preferred embodiment of the present invention.

Referring now to the drawing, and to Fig. 1 thereof in particular, there is shown a shaft 1 which may constitute the shaft of a weighting roller incorporated in a spinning machine or the like. The shaft 1 is formed with grooves 2 which form ball races adapted to receive the balls 3. The balls 3 are surrounded by a tubular retaining member 4 which is maintained in coaxial alignment with the shaft 1 by a suitable spacer ring 5. The latter is maintained in axial alignment with the retaining member 4 by means of a spring ring 6.

The retaining member 4 is illustrated as an inner tubular member which is slidably arranged within an outer tubular member 7 which may be surrounded by an elastic cover sleeve 8. The member 7 is formed at its inner surface with two annular grooves 9 within each of which is positioned a spring ring 10. A tubular connecting member 12 which is formed at one end with a flange portion 11 and at the opposite end with an annular bead or projecting means 14 is arranged within the tubular member 7 in such a manner that the flange portion 11 is arranged between the spring rings 10, the latter being axially spaced from each other a distance approximately equal to the thickness of the flange portion 11. The connecting member 12 is thus axially movable with the outer tubular member 7.

The connecting member 12 is made of a resilient material, as, for example, a resilient plastic or spring steel, so that the annular bead is resiliently yieldable in radial direction of the tubular members. If desired, the connecting member 12 may be longitudinally slotted as shown at 13 so as to improve the elasticity or resiliency of the connecting member.

The retaining member 4 is formed with receiving means such as an annular groove 15 which is adapted to receive the annular bead 14 of the connecting member 12. As may readily be seen from the drawing, the bead 14 and the groove 15 are constructed and arranged so as to be adapted to be moved into an engaging position wherein the bead 14 is received within the groove 15 when the tubular members 4 and 7 are moved relative to each other in one axial direction into a coupled position, shown in Fig. 1, and so as to be adapted to be moved out of the engaging position when the tubular members 4 and 7 are moved relative to each other in the opposite axial direction out of the coupled position. The bead 14 yields resiliently during such movement, but will occupy the position illustrated in Fig. 1 when the tubular members 4 and 7 are in their coupled position.

If desired, a protective cover 16 may be arranged between the connecting member 12 and the left hand free end of the shaft 1 so as to keep out dirt and other undesired particles.

It will be seen from the above that the spring rings 10 act as annular retaining elements and that by virtue of the fact that they are in engagement with opposite faces of the flange 11 of the connecting member 12 they act as securing means for securing this connecting member 12 to the outer tubular member 7. If desired, these securing means may be consituted by a shoulder formed on the inside of the outer member, which shoulder is adapted to seat thereon one face of the flange 11 of the connecting member 12. Suitable means are then provided which are in engagement with the opposite face of the flange 11 and which press the same against the shoulder.

Figure 3:
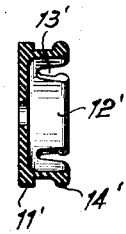
Fig. 3 is a sectional view of another preferred embodiment of a connecting member adapted to be used in the embodiment illustrated in Fig. 1.

Fig. 3 is illustrative of another connecting member 12' which may be incorporated in the detachable connection arrangement illustrated in Fig. 1. The connecting member 12' is formed with a flange portion 11', an annular bead 14', and is longitudinally slotted as shown at 13'. Additionally, the connecting member 12' is formed with an end face.

Figure 4:
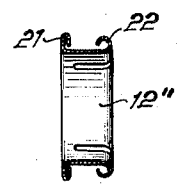
Fig. 4 is a sectional view of another preferred embodiment of a connecting member adapted to be used in the embodiment illustrated in Fig. 1.

Fig. 4 is illustrative of another connecting member 12" which may be used in the detachable connection arrangement shown in Fig. 1. The connecting member 12" is made of spring steel sheet and is formed with rolled edges 21 and 22 which constitute the flange portion and bead, respectively. As in the above described embodiments, the connecting member 12" may be longitudinally slotted so as to improve the resiliency of the bead.

Figure 2:
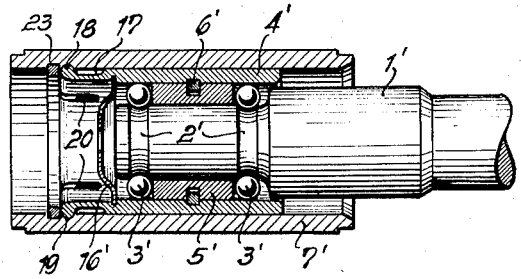
Fig. 2 is a sectional view of another preferred embodiment of the present invention.

In the embodiment illustrated in Fig. 2, the elements 1' to 7' and 16' correspond, respectively, to the elements 1 to 7 and 16 of the embodiment illustrated in Fig. 1. The embodiment illustrated in Fig. 2 differs from that illustrated in Fig. 1 in that the retaining member 4' is formed with a recessed tubular end portion 17 which carries, at its free end, an annular bead or projecting means 18 which is adapted to be received in an annular groove 19 formed along the inner surface of the outer tubular member 7'. As in the above described embodiment, the bead 18 is resiliently yieldable in radial direction of the tubular members, so that the tubular members 4' and 7' may be connected and disconnected from each other in the manner described above.

The end portion 17 may be longitudinally slotted, as shown at 20, so that the bead 18 is compressed when the members 4' and 7' are moved into and out of their coupled position.

A spring ring 23 which is seated in an annular groove formed in the inner surface of the outer tubular member 7' may serve as a stop against which the free end of the end portion 17 may abut when the tubular members 4' and 7' are in their coupled position.

It will be understood that each of the elements described above, or two or more together, may also find a useful application in other types of detachable connection arrangements differing from the types described above.

While the invention has been illustrated and described as embodied in a detachable connection arrangement for securing two coaxial tubular members against axial movement relative to each other, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A detachable connection arrangement comprising, in combination, an outer hollow cylindrical member and an inner cylindrical member arranged therewithin for axial movement relative thereto, one of said members being formed with receiving means along a cylindrical surface thereof; connecting means having a radially projecting resiliently yieldable portion adapted to be received within said receiving means; and securing means for securing said connecting means to the other of said members in such a manner that said connecting means and said other member are axially movable with each other, said connecting means being so shaped as to be moved into an engaging position wherein said projecting portion thereof is received by said receiving means when said members are moved relative to each other in one axial direction into a coupled position and moved out of said engaging position when said members are moved relative to each other in the opposite axial direction out of said coupled position, said projecting portion resiliently yielding during such movements.

2. A detachable connection arrangement comprising, in combination, an outer tubular member and an inner tubular member arranged therewithin for axial movement relative thereto, said inner member being formed with an annular groove along its inner surface; a tubular connecting member having outwardly projecting but inwardly resiliently yieldable annular means; and securing means for securing said connecting member to said outer member in such a manner that said connecting member and said outer member are axially movable with each other, said connecting member being so shaped as to be moved into an engaging position wherein said projecting means thereof is received by said annular groove when said inner and outer members are moved relative to each other in one axial direction into a coupled position and moved out of said engaging position when said inner and outer members are moved relative to each other in the opposite axial direction out of said coupled position, said projecting means resiliently yielding inwardly during such movements.

3. A detachable connection arrangement comprising, in combination, an outer tubular member and an inner tubular member arranged therewithin for axial movement relative thereto, said inner member being formed with an annular groove along its inner surface; a tubular connecting member having outwardly projecting annular means at one end thereof, said connecting member being longitudinally slotted and formed of a resilient material so that said projecting means is resiliently in radial direction of said members and may deform inwardly; and securing means for securing said connecting member to said outer member in such a manner that said connecting member and said outer member are axially movable with each other, said connecting member being so shaped as to be moved into an engaging position wherein said projecting means thereof is received by said annular groove when said inner and outer members are moved relative to each other in one axial direction into a coupled position and moved out of said engaging position when said inner and outer members are moved relative to each other in the opposite axial direction out of said coupled position, said projecting means resiliently yielding inwardly during such movements.

4. A detachable connection arrangement comprising, in combination, an outer tubular member and an inner tubular member arranged therewithin for axial movement relative thereto, said inner member being formed with an annular groove along its inner surface; a tubular connecting member having outwardly projecting but inwardly resiliently yieldable annular means at one end thereof and a flange portion at the opposite end thereof; and securing means for securing said connecting member at said flange portion thereof to said outer member in such a manner that said connecting member and said outer member are axially movable with each other, said connecting member being so shaped as to be moved into an engaging position wherein said projecting means thereof is received by said annular groove when said inner and outer members are moved relative to each other in one axial direction into a coupled position and moved out of said engaging position when said inner and outer members are moved relative to each other in the opposite axial direction out of said coupled position, said projecting means resiliently yielding inwardly during such movements, said securing means including a pair of annular retaining elements arranged at the inner surface of said outer member, said retaining elements being axially spaced from each other a distance substantially equal to the thickness of said flange portion of said connecting member and respectively being in engagement with opposite faces of said flange portion.

5. A detachable connection arrangement comprising, in combination, an outer tubular member and an inner tubular member arranged therewithin for axial movement relative thereto, said inner member being formed with an annular groove along its inner surface; a tubular connecting member having outwardly projecting but inwardly resiliently yieldable annular means at one end thereof and a flange portion at the opposite end thereof; and securing means for securing said connecting member at said flange portion thereof to said outer member in such a manner that said connecting member and said outer member are axially movable with each other, said connecting member being so shaped as to be moved into an engaging position wherein said projecting means thereof is received by said annular groove when said inner and outer members are moved relative to each other in one axial direction into a coupled position and moved out of said engaging position when said inner and outer members are moved relative to each other in the opposite axial direction out of said coupled position, said projecting means resiliently yielding inwardly during such movements, said securing means including a shoulder formed on the inside of said outer member and adapted to seat thereon one face of said flange portion of said connecting member, and means in engagement with the opposite face of said flange portion for pressing the same against said shoulder.

6. A detachable connection arrangement as defined in claim 1, wherein said inner cylindrical member is tubular, wherein said receiving means being formed along the inner surface of one of said members, and wherein said connecting means having a radially outwardly projecting but inwardly resiliently yieldable portion adapted to be received within said receiving means, which projecting portion will inwardly yield during movement of said members relative to each other in one axial direction.

References Cited in the file of this patent

UNITED STATES PATENTS

| | | |
|---|---|---|
| 367,578 | Babb | Aug. 2, 1887 |
| 1,015,906 | Payen | Jan. 30, 1912 |
| 1,667,485 | Macdonald | Apr. 24, 1928 |
| 1,867,364 | Lee | July 12, 1932 |
| 2,327,951 | Zaleske | Aug. 24, 1943 |